US012714965B2

(12) United States Patent
Fritz et al.

(10) Patent No.: US 12,714,965 B2
(45) Date of Patent: Aug. 25, 2026

(54) METHOD AND SYSTEM FOR SEPARATING A GAS MIXTURE

(71) Applicant: Linde GmbH, Pullach (DE)

(72) Inventors: Helmut Fritz, Pullach (DE); Werner Leitmayr, Pullach (DE); Martin Lang, Pullach (DE)

(73) Assignee: Linde GmbH, Pullach (DE)

( * ) Notice: Subject to any disclaimer, the term of this patent is extended or adjusted under 35 U.S.C. 154(b) by 314 days.

(21) Appl. No.: 18/688,405

(22) PCT Filed: Sep. 5, 2022

(86) PCT No.: PCT/EP2022/025414
§ 371 (c)(1),
(2) Date: Mar. 1, 2024

(87) PCT Pub. No.: WO2023/030693
PCT Pub. Date: Mar. 9, 2023

(65) Prior Publication Data

US 2024/0382894 A1 Nov. 21, 2024

(30) Foreign Application Priority Data

Sep. 6, 2021 (EP) .................................... 21020448

(51) Int. Cl.
*B01D 53/02* (2006.01)
*B01D 53/00* (2006.01)
*B01D 53/047* (2006.01)

(52) U.S. Cl.
CPC ......... *B01D 53/002* (2013.01); *B01D 53/047* (2013.01); *B01D 2256/16* (2013.01);
(Continued)

(58) Field of Classification Search
CPC ............ B01D 2256/16; B01D 2256/20; B01D 2257/502; B01D 2257/504;
(Continued)

(56) References Cited

U.S. PATENT DOCUMENTS 5,329,775 A * 7/1994 Fiedler .................. F25J 3/0257 62/929
5,483,801 A * 1/1996 Craze ..................... F25J 3/0635 62/910

(Continued)

FOREIGN PATENT DOCUMENTS

EP 2692411 A2 2/2014
WO 2006055324 A2 5/2006

*Primary Examiner* — Christopher P Jones
(74) *Attorney, Agent, or Firm* — Millen, White, Zelano & Branigan, P.C.; Brion P. Heaney

(57) ABSTRACT

Separating a starting gas mixture using pressure swing adsorption. In this, at least part of a low-pressure extraction flow from the pressure swing adsorption is subjected to a thermal separation, wherein a return fraction is formed in the thermal separation which is returned to the pressure swing adsorption separation. In the thermal separation, counterflow cooling takes place to obtain a two-phase mixture, wherein at least part of the two-phase mixture is subjected to phase separation to obtain a gas phase and a condensate. At least a part of the gas phase is used to form the return fraction, and counterflow cooling is carried out using at least a part of the gas phase and at least a part of one or more fluid flows which are formed by expansion of at least a part of the liquid phase.

13 Claims, 4 Drawing Sheets

(52) U.S. Cl.
CPC .. *B01D 2257/502* (2013.01); *B01D 2257/504* (2013.01); *B01D 2259/40013* (2013.01)

(58) Field of Classification Search
CPC ........ B01D 2259/40013; B01D 53/002; B01D 53/0407; B01D 53/047; F25J 2205/40; F25J 2205/64; F25J 2210/04; F25J 2220/82; F25J 2230/30; F25J 2235/80; F25J 2245/02; F25J 2270/02; F25J 2270/90; F25J 3/0625; F25J 3/0655; F25J 3/067
See application file for complete search history.

(56) References Cited

U.S. PATENT DOCUMENTS

| | | | | |
|---|---|---|---|---|
| 5,632,803 | A * | 5/1997 | Stoner | C01B 23/0052 95/143 |
| 5,771,714 | A * | 6/1998 | Emley | F25J 3/0257 62/923 |
| 5,881,577 | A * | 3/1999 | Sauer | D06F 43/00 68/5 R |
| 11,952,270 | B2 * | 4/2024 | Terrien | B01D 53/229 |
| 2006/0248921 | A1 * | 11/2006 | Hosford | B01D 53/047 62/611 |
| 2009/0320679 | A1 * | 12/2009 | Baksh | B01D 53/0462 96/112 |
| 2015/0114033 | A1 * | 4/2015 | Higginbotham | F25J 3/08 62/617 |
| 2017/0045290 | A1 | 2/2017 | Ploeger et al. | |
| 2021/0268426 | A1 * | 9/2021 | Zhang | B01D 53/08 |

* cited by examiner

METHOD AND SYSTEM FOR SEPARATING A GAS MIXTURE

The invention relates to a method and a system for separating a gas mixture according to the respective preambles of the independent patent claims.

BACKGROUND OF THE INVENTION

Pressure swing adsorption (PSA) is generally used to separate gaseous substance mixtures. With PSA, the different strengths of adsorption forces of the individual gas molecules or atoms against the employed adsorbent are exploited.

PSA and variants thereof, as well as other adsorption methods and the corresponding technical principles, are described extensively in the technical literature, for example in the article of H.-J. Bart and U. v. Gemmingen, "Adsorption," in Ullmann's Encyclopedia of Industrial Chemistry, online publication 2012, DOI: 10.1002/14356007.b03_09.pub2.

The substance mixture identified in Table 1 is merely an example of a problem underlying the present invention:

TABLE 1

| Component | Concentration [mol. %] | Adsorption force | Boiling point [K] at 1 bar |
|---|---|---|---|
| Hydrogen | 74.700 | Very weak | 20 |
| Carbon monoxide | 10.000 | Weak to medium | 102 |
| Carbon dioxide | 15.000 | Strong | 195 (sublimation) |
| Water | 0.3000 | Very strong | 373 |

One widespread use of PSA is the recovery of the weaker or the weakest adsorbable component(s) in enriched or pure form, i.e. hydrogen in the example of the gas mixture indicated in Table 1. In other cases, in contrast, the recovery of the stronger or most strongly adsorbable component(s) in enriched or pure form, i.e. carbon dioxide in the example of the gas mixture indicated in Table 1, is of interest.

The present invention is not limited to the use of the gas mixture indicated in Table 1 or comparable gas mixtures. It is also suitable for other gas mixtures which have more strongly and weakly adsorbable components, as explained further below.

In a typical PSA method, which is shown highly schematized in FIG. 1, the reference signs of which are used below, one inlet flow 1 and two outlet flows 2, 3 are formed. The inlet flow 1 is supplied to the PSA 10 at a pressure corresponding to an adsorption pressure in the PSA 10.

The outlet flow 2 (generally referred to as a "high-pressure product" and hereinafter also referred as a "high-pressure extraction flow") is extracted from the PSA 10 approximately at the inlet pressure. In contrast, the outlet flow 3 (generally referred to as a "low-pressure product" and hereinafter also referred to as "low-pressure extraction flow") is extracted from the PSA at a significantly lower pressure, namely at a desorption pressure. The desorption pressure can also be subatmospheric; this is referred to as a "vacuum" PSA (VPSA).

Where "a PSA" is referred to here and below, it should be understood to mean both a corresponding method or a corresponding method step and a technical device designed to carry out such a method or method step, or a corresponding apparatus or corresponding system component.

Adsorption takes place during PSA typically using porous adsorbents. The adsorbed shares of the adsorbable components depend in particular on the pressure of the inlet flow supplied to the PSA, i.e. the adsorption pressure, and on the selectivity of the adsorbent. The adsorbent used in the PSA is located in corresponding adsorption containers.

If one wishes to obtain hydrogen in pure form for the previously selected example, i.e. the gas composition according to Table 1, the typical split factors indicated in Table 2 can be used, again with reference to the highly schematized arrangement shown in FIG. 1, where "yield" refers to the share of the components of the inlet flow 1 that passes into the outlet flow 2. The split factor corresponds to the volume shares of the inlet flow which are transferred (with different contents of the respective components) into the outlet flow 2 on the one hand and 3 on the other hand (see table line "Quantity").

TABLE 2

| | Unit | Inlet flow 1 | Outlet flow 2 | Outlet flow 3 |
|---|---|---|---|---|
| Quantity | $Nm^3/h$* | 10000.0 | 6573.9 | 3426.1 |
| Pressure | Bar | 25.0 | 24.00 | 1.30 |
| Temperature | ° C. | 40.0 | 45.0 | 26.5 |

| Component | Unit | Inlet flow 1 | Outlet flow 2 | Outlet flow 3 | Yield |
|---|---|---|---|---|---|
| Hydrogen | Mol. % | 74.700 | 99.9949 | 26.1641 | 88.00% |
| Carbon monoxide | Mol. % | 10.000 | 0.0050 | 29.1784 | 0.0329% |
| Carbon dioxide | Mol. % | 15.000 | 0.0001 | 43.7818 | 0.0004% |
| Water | Mol. % | 0.3000 | 0.0000 | 0.8756 | 0.0000% |

*Standard cubic meters per hour

In the example in Table 2, the components carbon monoxide, carbon dioxide and water are present in higher concentrations in the outlet flow 3 than in the outlet flow 2 for the split factor used here. In contrast, the outlet flow 2 comprises substantially hydrogen, which is desired in this embodiment.

However, it is often not of interest for a component such as hydrogen in the case of Table 2 to be particularly pure in the outlet flow 2. If, for example, the carbon dioxide of the mixture according to Table 2 is to be particularly concentrated by means of a PSA process, the mode of operation of the PSA can be adapted such that the values indicated in Table 3 result.

For this purpose, the split factor can be adjusted accordingly (see the table lines "Amount" in Tables 2 and 3).

TABLE 3

| | Unit | Inlet flow 1 | Outlet flow 2 | Outlet flow 3 |
|---|---|---|---|---|
| Quantity | $Nm^3/h$* | 10000.0 | 8201.2 | 1798.8 |
| Pressure | Bar | 25.0 | 24.00 | 1.30 |
| Temperature | ° C. | 40.0 | 45.0 | 16.5 |

| Component | Unit | Inlet flow 1 | Outlet flow 2 | Outlet flow 3 | Yield |
|---|---|---|---|---|---|
| Hydrogen | Mol. % | 74.700 | 87.4409 | 16.6111 | 96% |
| Carbon monoxide | Mol. % | 10.000 | 10.7301 | 6.6711 | 88% |
| Carbon dioxide | Mol. % | 15.000 | 1.8290 | 75.0500 | 10% |
| Water | Mol. % | 0.3000 | 0.0000 | 1.6678 | 0.0% |

*Standard cubic meters per hour

In the example in Table 3, the carbon dioxide content, in comparison with the starting mixture of the inlet flow 1 (15 mol. %), can be increased about fivefold (75 mol. %) in the outlet flow 3.

If the achieved concentration of a medium-to-highly adsorbable component of the inlet flow 1 by a corresponding method is not quite sufficient, a so-called circulation mode can be used in which a part of the outlet flow 3 is mixed back into the fresh inlet flow 1. A corresponding circuit mode is shown in a highly schematic manner in FIG. 2, wherein the reference signs used there are used in the following.

Here, the low-pressure product is first extracted from the PSA 10 in the form of an outlet flow 3'. A recycled share is shown in the form of a material flow 4. This is compressed by means of a compressor 11 downstream from an after-cooler 12, guided through a (droplet) separator 13, and supplied as a material flow 4' together with the inlet flow 1 in the form of a collective flow 1' of the PSA 10. The share of the outlet flow 3' that is not returned, i.e., for example, an exported low-pressure product, is designated with 3 as previously in FIG. 1.

By means of a corresponding circuit mode, the concentration of the carbon dioxide in the outlet flow 3 can further increase when the previously described mixture is used. A further advantage results from the often desired higher yield of the weakly adsorbable components in the direction of the outlet flow 2. Even with high circulation rates of 70% (i.e. a ratio of 0.7 of material flow 4 to material flow 3'), the concentration of carbon dioxide cannot, however, be increased as desired. A corresponding situation is illustrated in Table 4. It can also be seen from Table 4 that, although the concentration of the carbon dioxide in the outlet flow 3 is stronger, the "loss" of carbon dioxide in the direction of the outlet flow 2 simultaneously also increases in principle, however.

TABLE 4

| | Unit | Material flow according to FIG. 2 | | | | | |
|---|---|---|---|---|---|---|---|
| | | 1 | 2 | 3' | 4 | 3 | |
| Quantity | $Nm^3/h$* | 10000.0 | 8201.2 | 4129.3 | 2890.5 | 1238.8 | |
| Pressure | Bar | 25.0 | 24.00 | 1.30 | 1.30 | 1.30 | |
| Temperature | ° C. | 40.0 | 45.0 | 20.0 | 20.0 | 20.0 | Yield: |
| Hydrogen | Mol. % | 74.700 | 84.3765 | 7.4445 | 7.4445 | 7.4445 | 96% |
| Carbon monoxide | Mol. % | 10.000 | 10.9871 | 3.1726 | 3.1726 | 3.1726 | 88% |
| Carbon dioxide | Mol. % | 15.000 | 4.6364 | 88.3597 | 88.3597 | 88.3597 | 10% |
| Water [%] | Mol. % | 0.3000 | 0.0000 | 1.0232 | 1.0232 | 1.0232 | 0.0% |

*Standard cubic meters per hour

A further increase in concentration is possible in principle with a series connection of two or more PSA units with intermediate compression, as is not illustrated separately here. However, a minimum amount of weakly adsorbable components in the inlet flow to the PSA is also always required since the pressure build-up can only be carried out in this way.

The last stage of a multistage PSA is thereby defined in principle. The content of weakly to very weakly adsorbable components must be in the range from 15 to 35 mol. % at the inlet thereto. If it were less, the PSA process itself would collapse. An arbitrarily high content of the desired components in the outlet flow 3 or an outlet flow then correspondingly formed cannot be achieved in this way either.

As a result, from a technical point of view, not just any number of PSA units can be connected in series to achieve an arbitrarily high concentration of the medium-to-strongly adsorbable component in the low-pressure product.

It is also known to supply a extraction flow 3', as shown in FIG. 3, to a thermal separation, and to separate at least some of the higher-boiling components, which typically adsorb more strongly in the PSA at the same time, in this thermal separation. A remaining gas phase, which therefore predominantly contains the lower-boiling components which typically at the same time adsorb more weakly in the PSA, can then be returned to the PSA instead of the material flow 4' illustrated in FIG. 2.

A corresponding variant is illustrated in FIG. 3 in a highly generalized form, wherein the thermal separation is indicated here with 50. The term "low-temperature separation" is also used below instead of the term "thermal separation." A material flow 4" from the thermal separation is enriched with the lower-boiling components and depleted of the higher-boiling components; the material flow referred to here as 3" is, in contrast, enriched with the higher-boiling components and depleted of the lower-boiling components.

The object of the present invention is to improve methods and systems for adsorptive concentration of strongly adsorbable components using a PSA.

DISCLOSURE OF THE INVENTION

This object is achieved by a method and a system for the separation of a gas mixture having the features of the respective independent patent claims. Embodiments are the subject matter of the dependent claims and of the following description.

The proposed method according to the invention serves for the separation of a starting gas mixture which comprises a first component or component group (in particular one or more "light" components which adsorb more weakly in the PSA and at the same time have a lower boiling point) and a second component or component group (in particular one or more "heavy" components which adsorb more strongly in the PSA and at the same time have a lower boiling point).

As is known in this respect for PSA methods, a feed flow is also formed within the scope of the present invention using at least part of the starting gas mixture, which is referred to here as the "first" separation feed flow for the sake of better differentiation, and which contains the first component or component group and the second component or component group. The separating feed flow is fed to a PSA, i.e. pressure swing adsorption separation, at feed pressure.

From the pressure swing adsorption separation, a high-pressure extraction flow at a pressure in a first pressure range and a low-pressure extraction flow are extracted at a pressure in a second pressure range below the first pressure range, wherein the first component or component group from the first separating feed flow in the pressure swing adsorption separation is transferred to a greater extent into the high-pressure extraction flow and to a lesser extent into the low-pressure extraction flow, and wherein the second component or component group from the first separating feed flow in the pressure swing adsorption separation is transferred to a lesser extent into the high-pressure extraction flow and to a greater extent into the low-pressure extraction flow.

Within the scope of the invention, at least a part of the low-pressure extraction flow is subjected to compression at a pressure in a third pressure range and used to form a material flow which is referred to here for better differentiation as a "second separation feed flow." The latter is subjected to a thermal separation (low-temperature separation) at the pressure in the third pressure range.

In the thermal separation, at least a part of the second separation feed flow is subjected by cooling to the pressure in the third pressure range to partial condensation to obtain a first gas phase and a first condensate (hereinafter also referred to as a "first liquid phase"). Furthermore, a second gas phase and a second condensate ("second liquid phase") are formed in the thermal separation by expanding ("flashing") at least a part of the first condensate, in particular from the pressure in the third pressure range to a pressure in a fourth pressure range below the third pressure range.

According to the invention, a first share of the second condensate is now liquid-pressurized and discharged from the process. Before the first liquid-pressurized share of the second condensate is discharged from the process, it can either be vaporized, as explained again below and illustrated in FIG. 4, in a heat exchanger used in the thermal separation and thus used as a refrigerant, or it can, as illustrated in FIG. 5, be discharged as a liquid from the process, in which case an additional refrigerant can be used in the thermal separation. A second share of the second condensate, on the other hand, is vaporized and used in the formation of the second separating feed flow.

By the expansion and recirculation of the second share of the second condensate proposed according to the invention, cold for low-temperature separation can be generated in a particularly advantageous manner in accordance with the principle of a heat pump. The returned share, like a refrigerant in a refrigerant circuit, is initially present in a condensed state, vaporized in counterflow to the second separating feed flow as it cools, then recompressed when the second separating feed flow is formed, and again subjected to condensation in the thermal separation unit.

The pressurization of the first share of the second condensate in the liquid state makes it possible to dispense with a gaseous compression, and thereby facilitates the structural implementation of the method according to the invention.

In particular, in the thermal separation, at least a part of the second separating feed flow is subjected to a partial condensation using counterflow cooling and obtaining a two-phase mixture, wherein at least a part of the two-phase mixture is subjected to a first phase separation while obtaining the first gas phase and the first condensate. The second condensate and the second gas phase are formed in particular without further cooling in a heat exchanger, but only by expansion (and possibly associated cooling) of the first condensate.

At least a part of the first and optionally second gas phase can be used here to form a return fraction, in principle as illustrated in FIG. 3 with respect to the material flow 4" and described above.

The counterflow cooling is carried out in particular in a counterflow to at least a part of the first and optionally second gas phase and to at least a part of the second share of the second liquid phase. Furthermore, either the first liquid-pressurized share of the second liquid phase, a part thereof, and/or a suitable separate refrigerant is used.

In other words, the cooling of at least a part of the second separation feed flow at the pressure in the third pressure range to its partial condensation in low-temperature separation can be carried out within the scope of the present invention, in particular using a counterflow heat exchanger in which at least a part of the first gas phase is heated, and at least a part of the second share of the second condensate is vaporized.

As mentioned above, the first condensate is depleted with respect to the second separating feed stream, in particular of the first component or component group, and enriched with the second component or component group, and the second condensate is depleted with respect to the first condensate, in particular of the first component or component group, and enriched with the second component or component group.

As already mentioned, the recirculation according to the invention achieves improved operation of the thermal separation in accordance with the principle of a heat pump. In this case, the vaporized second share of the second condensate used during the formation of the second separating feed flow is subjected to compression at the pressure in a third pressure range, in particular at least in part with the low-pressure extraction flow or a part thereof.

In the method proposed according to the invention, the second separating feed flow can be formed, in particular, using at least a part of the low-pressure extraction flow which is processed in a suitable manner and is freed from interfering components, for example.

Within the scope of the present invention, the third pressure range can be in particular 10 to 80 bar. The adsorption pressure in the PSA can be selected in a suitable manner. Within the scope of the present invention, a PSA operated at an superatmospheric desorption pressure, but also a VPSA explained at the outset, can be used.

Within the scope of the invention, the counterflow cooling and the expansion of at least a part of the first condensate to form the second condensate can in particular be carried out in such a way that the second liquid phase is present at a temperature and a pressure which are such that the second condensate can be completely vaporized during the corresponding heating. The person skilled in the art selects the specific values taking into account the respective composition of the relevant substance mixtures. A particularly advantageous adaptation of the heat exchange diagram can be achieved through two-stage vaporization.

Within the scope of the present invention, the counterflow cooling can in particular be carried out to a temperature of −30 to −100° C., and the expansion of at least a part of the first condensate to form the second two-phase mixture can be carried out in particular at an (absolute) pressure of from 1 to 40 bar, in particular from 1 to 10 or 1 to 15 bar. This pressure depends in particular also on the third pressure level.

In the proposed method according to the invention, the first component or component group comprises at least one of the components hydrogen, methane, nitrogen, oxygen and/or carbon monoxide, or represents a corresponding component, and the second component or component group comprises in particular at least one of the components carbon dioxide, ethane, ethylene, propane or butane, or represents such a component.

Within the scope of the present invention, the thermal separation can be carried out without an additional refrigerant so that corresponding refrigerant circuits and the like can be dispensed with. In this case, as mentioned, the liquid-pressurized first share of the second condensate can be vaporized in the thermal separation or the aforementioned counterflow heat exchanger before it is discharged from the process and thereby used as a refrigerant. Alternatively, the use of a separate refrigerant in the thermal separation is also possible. A combination of both alternatives is also possible.

In addition, within the scope of the present invention, the counterflow cooling is in particular not supplied with any more feed flows than the second separating feed flow, for example with no feed flows from a carbon dioxide removal.

In general, within the scope of the present application, if used, the terms “enriched” and “depleted” should generally refer to a content in a starting fluid from which the relevant fluid is obtained. The fluid is referred to as enriched if it contains at least 1.1 times, 1.5 times, 2 times, 5 times, 10 times, 100 times or 1,000 times the content of a corresponding component in relation to the starting fluid. Accordingly, the fluid is referred to as depleted if it contains at most 0.9 times, 0.5 times, 0.1 times, 0.01 times or 0.001 times the content of a corresponding component in relation to the starting fluid.

With regard to the system provided according to the invention and its features, reference is expressly made to the respective independent device claim and the above explanations of the method according to the invention, since these likewise concern a corresponding device. The same applies in particular to an embodiment of a corresponding device which is advantageously configured for carrying out a corresponding method in any embodiment.

The invention is further explained below with reference to the figures, which illustrate an embodiment of the present invention in comparison with the prior art.

DETAILED DESCRIPTION OF THE DRAWINGS

In the further description above and in the following, systems and, on the basis thereof, corresponding method steps not according to the invention and those formed according to embodiments of the invention have been or are described. Merely for the sake of simplicity and to avoid unnecessary repetition, in this case the same reference signs and explanations have been or are used for method steps and system components (for example, a cooling step and a heat exchanger used for this purpose). In the figures, identical reference signs are used for identical or comparable components, and these are not explained repeatedly simply for the sake of clarity.

Figure 1:
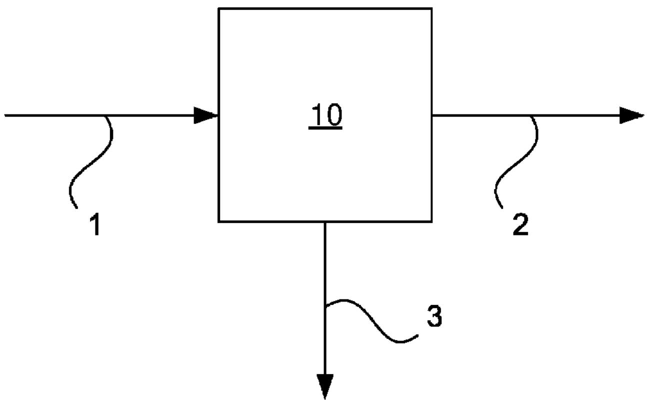
FIGS. 1 to 3 show arrangements not according to the invention.
Figure 2:
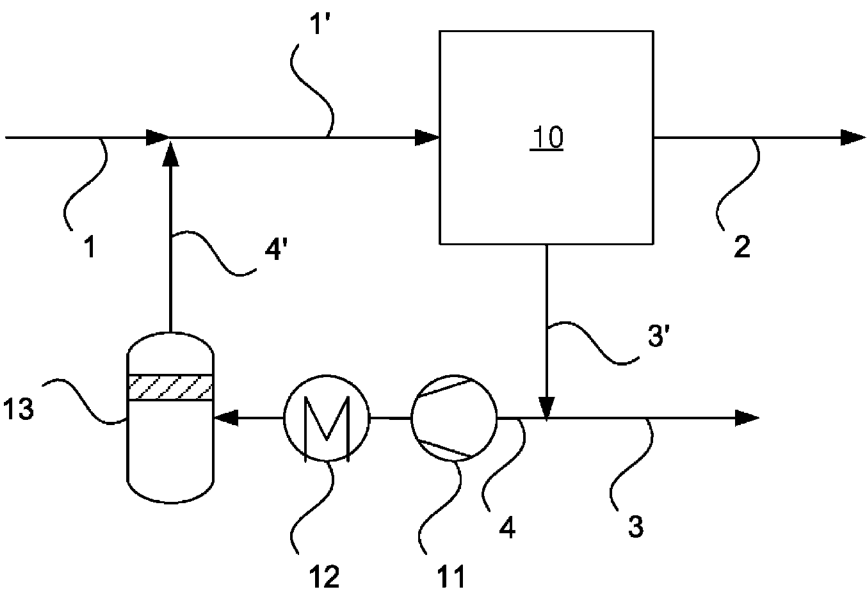
Figure 3:
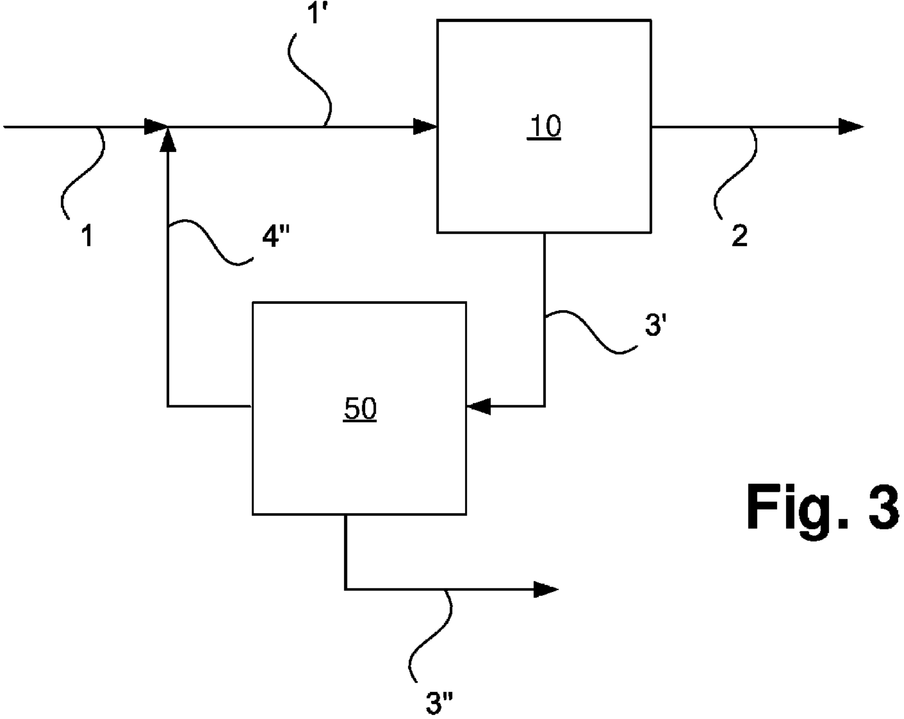

FIGS. 1 to 3 have already been explained above.

Figure 4:
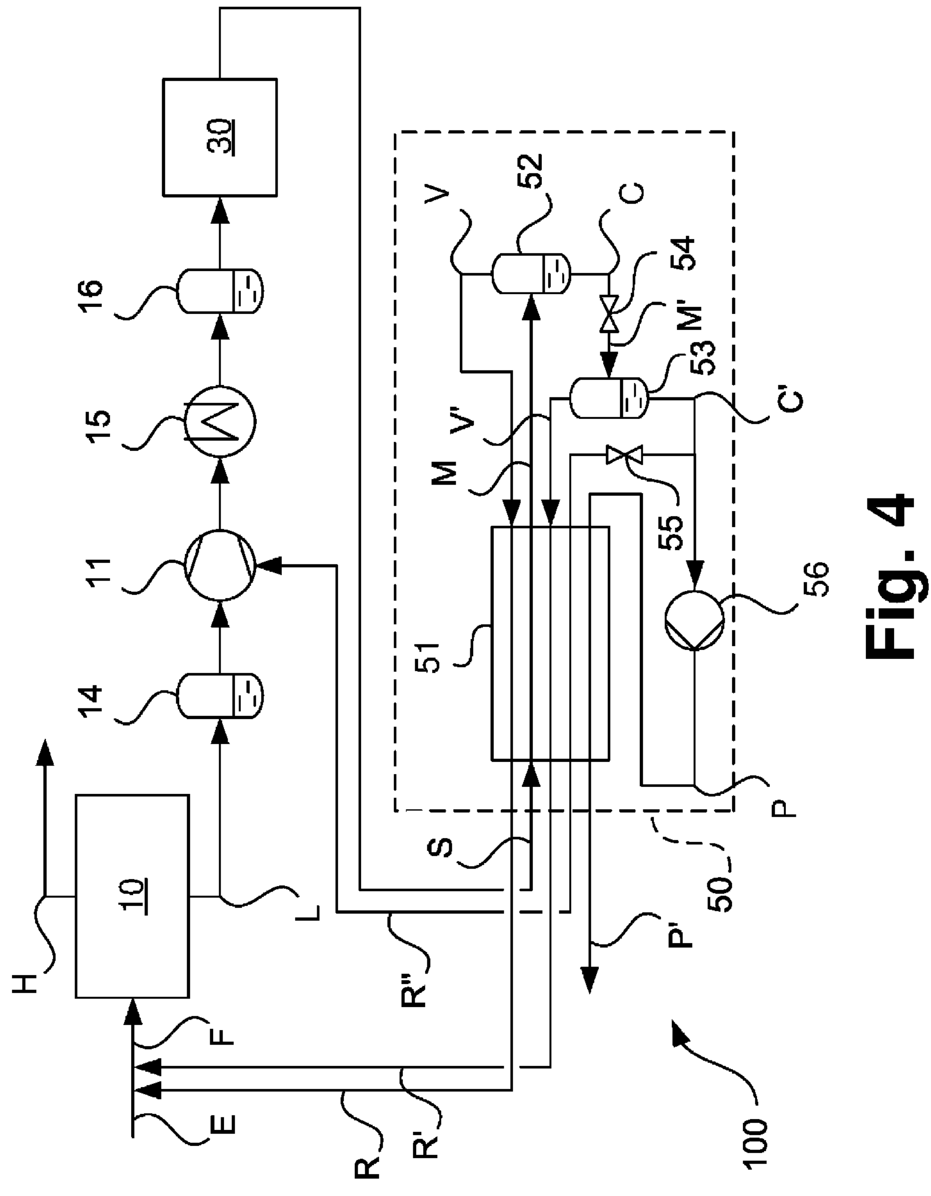
FIG. 4 shows an arrangement according to an embodiment of the invention.
Figure 5:
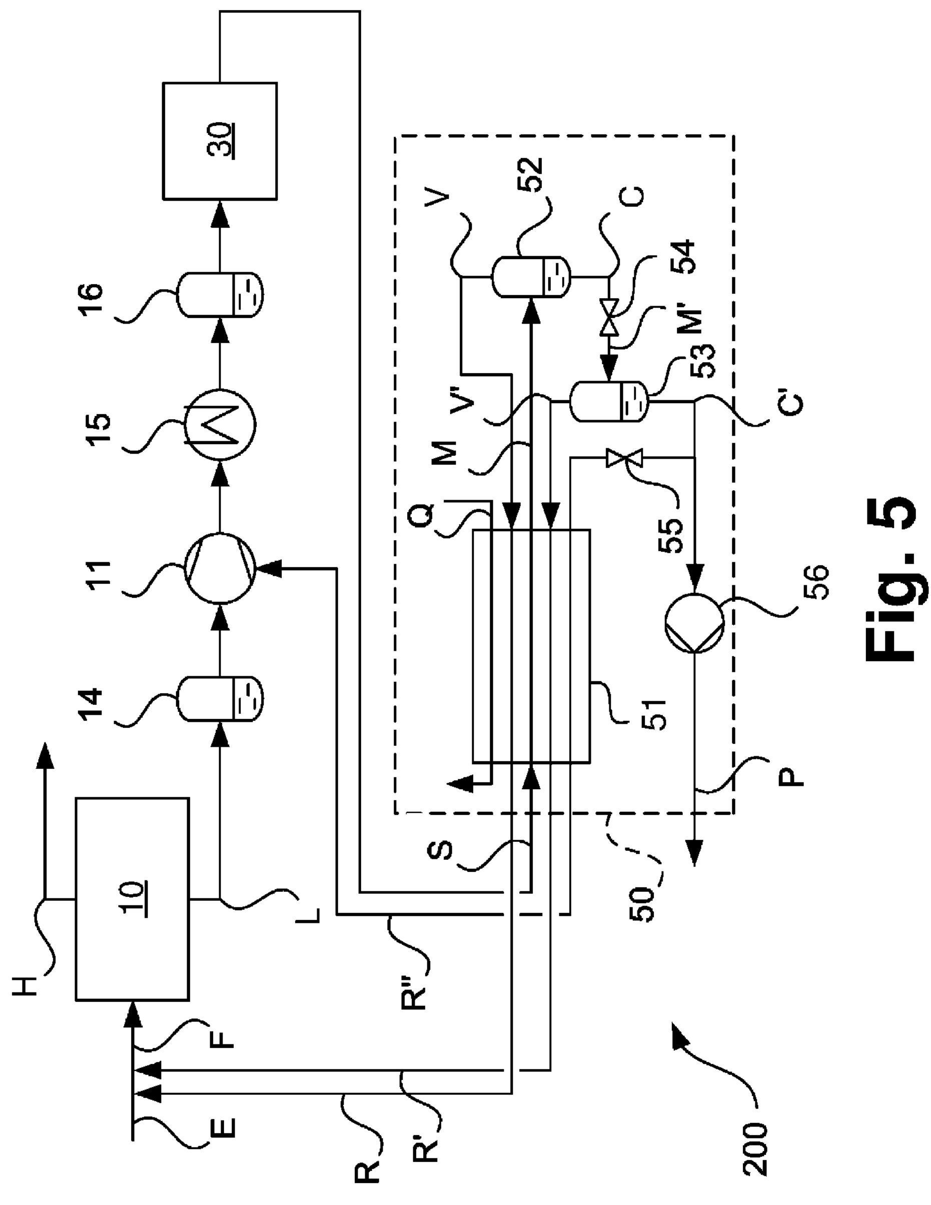
FIG. 5 shows an arrangement according to an embodiment of the invention.

FIGS. 4 and 5 illustrate methods according to embodiments of the invention and are denoted overall by 100 or 200.

The apparatuses shown in FIGS. 4 and 5 bear the same reference signs as those illustrated in FIGS. 1 to 3. A PSA is indicated by 10, a container arranged on the suction side of a compressor 11 by 14, an aftercooler by 15, a further container arranged downstream therefrom by 16 and a treatment device, for example for removing unwanted components, by 30. Low-temperature separation is indicated as 50 in FIG. 3, but illustrated here with details according to embodiments of the invention. The low-temperature separation 50 comprises a counterflow or plate heat exchanger 51, separator 52 and 53 and expansion valves 54 and 55.

In the arrangements illustrated in FIGS. 4 and 5, a freshly supplied gas mixture is also designated E (previously 1), an inlet flow formed therefrom into the PSA 10, i.e. a first separation inlet flow, is designated by F (previously 1'), a high-pressure outlet flow by C (previously 2), a low-pressure outlet flow by L (previously 3'), a second separation insert flow by S (previously also 3') and return flows by R, R' and R" (previously 4"). In FIGS. 4 and 5, M denotes a first two-phase mixture with M' being a second two-phase mixture, C a first condensate, and C' a second condensate.

In the embodiments in FIGS. 4 and 5, the flow L will partially condense due to the compression in the compressor L, in contrast to flow 1, as a result of comparatively moderate cooling. In principle, such a partial condensation is always possible in the described cases since the strongly adsorbable components also have a comparatively high boiling point compared to the only slightly adsorbable components. In this case, this results in a strong concentration of the strongly adsorbable component(s) in the condensates C and C". In contrast, the concentration of the weakly adsorbable components(s) of the gas phases V and V" is again high.

According to FIGS. 4 and 5, the low-pressure outlet flow L is supplied to the compressor 11 at least in part and is compressed therein. The corresponding second separating feed flow S, possibly obtained after additional treatment in the unit 30, is further treated as explained below.

According to FIGS. 4 and 5, the separating feed flow S is cooled in the plate heat exchanger 51 to obtain the first two-phase flow M which is fed into the separator 52. A first gas phase V and a first liquid phase C are removed from the separator 52, wherein the first gas phase V is fed back into the PSA 10 in the form of the return flow R, i.e. is used to form the inlet flow F.

According to FIGS. 4 and 5, the first condensate C is expanded to form a second two-phase mixture M' at the expansion valve 54, and a second condensate C' and a second gas phase V' are formed in the separator 53. At least a part of the second gas phase V' is then advantageously used as a further return flow which is denoted by R' in FIGS. 4 and 5. The further return flow R' can either, if the pressures permit, be subjected again to the PSA 10 (as illustrated) or, together with the low-pressure outlet flow L or its correspondingly used part, again be subjected to compression in the compressor 11 and then to partial condensation.

A first part of the second condensate C' is liquid-pressurized in a pump 56 and used to provide a method product P, and a second share is expanded at the valve 55, then vaporized in the plate heat exchanger 51, and returned to the compressor 11 and used again in this way to form the second separation feed stream S.

The embodiments according to FIGS. 4 and 5 differ in that in the embodiment according to FIG. 4, the first part of the second condensate C' liquid-pressurized in the pump 56 is vaporized in the counterflow heat exchanger to form a material flow P', i.e. this material flow is used as refrigerant, and in the embodiment according to FIG. 5, the first part of the second condensate C' liquid-pressurized in the pump 56 is discharged in liquid form, and a separate refrigerant in the form of a material flow Q is used instead.

The achievable advantage within the scope of the invention is in particular that, even with circulation rates of 0.7 to 1.0, the content of strongly adsorbable components in the circuit does not increase arbitrarily since these can condense out and can thus be discharged in a targeted and selective manner. In this method, the yield of slightly adsorbable components increases to almost 100%.

The advantages of the last described embodiment of the invention can be explained with the aid of Table 4 below, in which F represents the gas mixture subjected to the method, C the high-pressure outlet flow, L the low-pressure outlet flow and C' the export flow formed from the additional liquid phase (with the same reference signs according to FIGS. 4 and 5).

TABLE 4

| | Unit | F | C | L | C | |
|---|---|---|---|---|---|---|
| Quantity | $Nm^3/h$* | 10000.0 | 8648.2 | 2137.9 | 1321.4 | |
| Pressure | Bar | 24.0 | 23.50 | 0.10 | 39.00 | |
| Temperature | ° C. | 40.0 | 41.0 | 28.5 | 40.0 | Yield: |
| Hydrogen | Mol. % | 74.700 | 86.3664 | 14.5574 | 0.0411 | 99.99% |
| Carbon monoxide | Mol. % | 10.000 | 11.4996 | 6.3435 | 0.4125 | 99.45% |
| Carbon dioxide | Mol. % | 15.000 | 2.1341 | 77.6965 | 99.5463 | 12.30% |
| Water | Mol. % | 0.3000 | 0.0000 | 1.4032 | 0.0000 | 0.00% |

*Standard cubic meters per hour

All previously made statements can be transferred to similar substance mixtures with stronger and weaker adsorbing components. In all explanations and in practical use, carbon dioxide can therefore be replaced by ethane or propane. Table 5 below presents the corresponding adsorption forces and boiling points.

TABLE 5

| Component | Concentration [mol. %] | Adsorption force | Boiling point [K] at 1 bar |
|---|---|---|---|
| Hydrogen | 74.700 | Very weak | 20 |
| Carbon monoxide | 10.000 | Weak to medium | 102 |
| Carbon dioxide | 15.000 | Strong | 195 (sublimation) |
| Ethane | | Strong | 184 |
| Propane | | Strong | 231 |
| Water | 0.3000 | Very strong | 373 |

Common to all methods is the desire to enrich a highly to strongly adsorbable component, which usually also has a higher boiling point than the less adsorbable components.

A specific example from technology is the extraction of gaseous carbon dioxide for so-called enhanced oil recovery from known steam reforming (SMR, steam methane reforming) which serves to generate hydrogen from hydrocarbons. In this case, carbon dioxide can be removed by means of PSA in accordance with the invention both in the residual gas flow and in the feed gas flow to the hydrogen PSA already present.

Table 6 below illustrates the case of the arrangement in the feed gas flow to the already present hydrogen PSA (for the designation of the flows, see explanations relating to Table 4).

TABLE 6

| | Unit | F | C | L | C | |
|---|---|---|---|---|---|---|
| Quantity | $Nm^3/h$* | 10000.0 | 8646.4 | 2202.8 | 1323.6 | |
| Pressure | bar | 24.0 | 23.50 | 0.10 | 39.00 | |
| Temperature | ° C. | 40.0 | 41.0 | 28.4 | 40.0 | Yield: |
| Hydrogen | Mol. % | 74.700 | 86.3895 | 14.1289 | 0.0333 | 99.99% |
| Carbon monoxide | Mol. % | 5.000 | 5.7557 | 3.0808 | 0.1767 | 99.53% |
| Carbon dioxide | Mol. % | 15.000 | 2.1663 | 76.5272 | 99.1738 | 12.49% |
| Methane | Mol. % | 5.0000 | 5.6884 | 4.9013 | 0.6162 | 98.37% |
| Water | Mol. % | 0.3000 | 0.0000 | 1.3619 | 0.0000 | 0.00% |

*Standard cubic meters per hour

The invention claimed is:

1. A method for separating a starting gas mixture which contains a first component or first component group and a second component or second component group, the method comprising:

forming a first separation feed flow, using at least a part of the starting gas mixture, which contains the first component or first component group and the second component or second component group, and supplying the first separation feed flow to a pressure swing adsorption separation, extracting, from the pressure swing adsorption separation, a high-pressure extraction flow at a pressure in a first pressure range and a low-pressure extraction flow at a pressure in a second pressure range wherein the second pressure range is below the first pressure range, wherein the first component or first component group from the first separating feed flow is transferred in the pressure swing adsorption separation to a greater extent into the high-pressure extraction flow and to a lesser extent into the low-pressure extraction flow, wherein the second component or second component group from the first separation feed flow is transferred in the pressure swing adsorption separation to a lesser extent into the high-pressure extraction flow and to a greater extent into the low-pressure extraction flow, subjecting at least a part of the low-pressure extraction flow to a compression at a pressure in a third pressure range to form a second separation feed flow and subjecting the second separation feed flow to a thermal separation at the pressure in the third pressure range, in the thermal separation, subjecting at least a share of the second separation feed flow subjected to cooling and partial condensation at the pressure in the third pressure range to obtain a first gas phase and a first condensate, and in the thermal separation, forming a second gas phase and a second condensate by expanding at least a share of the first condensate, wherein a first share of the second condensate is liquid-pressurized and discharged, and a second share of the second condensate is vaporized and used to form the second separation feed flow.

2. The method according to claim 1, in which the first condensate is depleted of the first component or first component group compared to the second separation feed flow and is enriched with the second component or second component group compared to the second separation feed flow, and in which the second condensate is depleted of the first component or first component group compared to the first condensate and is enriched with the second component or second component group compared to the first condensate.

3. The method according to claim 1, in which the cooling and partial condensation of the at least a share of the second separation feed flow at the pressure in the third pressure range in the thermal separation is carried out using a counterflow heat exchanger in which at least a part of the first gas phase is warmed, and at least a part of the second share of the second condensate is vaporized, wherein the at least part of the second share of the second condensate is used as a refrigerant in the counterflow heat exchanger.

4. The method according to claim 1, wherein, in the compression, the vaporized second share of the second condensate used during the formation of the second separation feed flow is subjected to the pressure in a third pressure range at least in part with the at least a part of the low-pressure extraction flow.

5. The method according to claim 1, wherein the third pressure range is 10 to 80 bar.

6. The method according to claim 1, wherein, in the thermal separation, the at least a part of the second separation feed flow is cooled to a temperature of −30 to −100° C., and wherein, in the thermal separation, the at least a part of the first condensate is expanded to a pressure of 1 to 40 bar.

7. The method according to claim 1, wherein the first component is hydrogen, nitrogen, oxygen, methane, or carbon monoxide, the first component group comprises hydrogen, nitrogen, oxygen, methane, and/or carbon monoxide, the second component is carbon dioxide, ethane, ethylene, propane, or butane, and the second component group comprises carbon dioxide, ethane, ethylene, propane, and/or butane.

8. The method according to claim 3, wherein the thermal separation is carried out without an additional refrigerant, and wherein at least a part the first share of the second condensate liquid-pressurized in the thermal separation is vaporized, or wherein the thermal separation is performed using an additional refrigerant.

9. The method according to claim 1, wherein the thermal separation is fed with no further feed flows than the second separation feed flow.

10. A system for separating a starting gas mixture, which contains a first component or first component group and a second component or second component group, the system comprising:

means for forming a first separation feed flow, using at least a part of the starting gas mixture, which contains the first component or first component group and the second component or second component group, and means for supplying the first separation feed flow to a pressure swing adsorption separation, means for removing a high-pressure extraction flow from the pressure swing adsorption separation at a pressure in a first pressure range, and means for removing a low-pressure extraction flow at a pressure in a second pressure range, wherein the second pressure range is below the first pressure range, wherein the first component or first component group is transferred from the first separation feed flow in the pressure swing adsorption separation to a greater share into the high-pressure extraction flow and to a lower share into the low-pressure extraction flow, wherein the second component or second component group is transferred from the first separation feed flow in the pressure swing adsorption separation to a lower share into the high-pressure extraction flow and to a greater share into the low-pressure extraction flow, means for subjecting at least a part of the low-pressure extraction flow to a compression at a pressure in a third pressure range to form a second separation feed flow, and subjecting the second separation feed flow to a thermal separation at the pressure in the third pressure range, in the thermal separation, means for subjecting at least a part of the second separation feed flow to a partial condensation by cooling at the pressure in the third pressure range to obtain a first gas phase and a first condensate, in the thermal separation, means for expanding at least a part of the first condensate, to form a second gas phase and a second condensate, and means for liquid-pressurizing a first share of the second condensate and discharging the first share of the second condensate, and means for vaporizing a second share of the second condensate and using the second share of the second condensate in the formation of the second separation feed flow.

11. A system for separating a starting gas mixture according to the method of claim 1, the system comprising:

means for forming the first separation feed flow, using at least a part of the starting gas mixture, and means for supplying the first separation feed flow to the pressure swing adsorption separation, means for removing the high-pressure extraction flow from the pressure swing adsorption separation at the pressure in a first pressure range and means for removing the low-pressure extraction flow at the pressure in a second pressure range, wherein the second pressure range is below the first pressure range, wherein the first component or first component group is transferred from the first separation feed flow in the pressure swing adsorption separation to a greater share into the high-pressure extraction flow and to a lower share into the low-pressure extraction flow, wherein the second component or second component group is transferred from the first separation feed flow in the pressure swing adsorption separation to a lower share into the high-pressure extraction flow and to a greater share into the low-pressure extraction flow, means for subjecting the at least a part of the low-pressure extraction flow to a compression at the pressure in a third pressure range to form the second separation feed flow, and subjecting the second separation feed flow to the thermal separation at the pressure in the third pressure range, in the thermal separation, means for subjecting the at least a part of the second separation flow to the partial condensation by cooling to the pressure in the third pressure range to obtain the first gas phase and the first condensate, in the thermal separation, means for expanding the at least a part of the first condensate, to form the second gas phase and the second condensate, and means for liquid-pressurizing the first share of the second condensate and discharging the first share of the second condensate, and means for vaporizing the second share of the second condensate and using the second share of the second condensate in the formation of the second separation feed flow.

12. The method according to claim 1, wherein, in the thermal separation, the at least a part of the second separation feed flow is cooled to a temperature of −30 to −100° C., and wherein, in the thermal separation, the at least a part of the first condensate is expanded to a pressure 1 to 10 bar.

13. The method according to claim 3, wherein the thermal separation is carried out using an additional refrigerant, and wherein at least a part the first share of the second condensate liquid-pressurized in the thermal separation is vaporized.

* * * * *